(12) United States Patent
Osten

(10) Patent No.: US 9,409,607 B2
(45) Date of Patent: Aug. 9, 2016

(54) COMPOSITE PANEL

(71) Applicant: Samuel J. Osten, Pittsburg, PA (US)

(72) Inventor: Samuel J. Osten, Pittsburg, PA (US)

(73) Assignee: IMPACT GUARD LLC, Leetsdale, PA (US)

( * ) Notice: Subject to any disclaimer, the term of this patent is extended or adjusted under 35 U.S.C. 154(b) by 0 days.

(21) Appl. No.: 14/587,717

(22) Filed: Dec. 31, 2014

(65) Prior Publication Data
US 2016/0185395 A1 Jun. 30, 2016

(51) Int. Cl.
*B62D 29/04* (2006.01)

(52) U.S. Cl.
CPC .................... *B62D 29/043* (2013.01)

(58) Field of Classification Search
CPC .... B62D 29/04; B62D 29/043; B62D 29/045; B62D 25/00; B62D 25/02; B62D 25/06; B62D 25/08; B62D 47/00; B60P 3/32
USPC ................ 296/156, 168, 181.1, 181.2, 182.1, 296/186.1, 901.01
See application file for complete search history.

(56) References Cited

U.S. PATENT DOCUMENTS

| | | | |
|---|---|---|---|
| 4,353,857 A * | 10/1982 | Ray | B29C 70/08 264/113 |
| 4,705,716 A * | 11/1987 | Tang | B29C 70/865 296/181.2 |
| 6,247,747 B1 * | 6/2001 | Kawanomoto | B60J 5/0498 296/181.3 |
| 6,375,249 B1 * | 4/2002 | Stanton | B60N 2/242 296/178 |
| 7,025,408 B2 | 4/2006 | Jones et al. | |
| 7,059,665 B2 * | 6/2006 | Murai | B29C 70/22 264/257 |
| 7,281,754 B2 * | 10/2007 | Behr | B29C 70/342 264/258 |
| 7,765,758 B2 * | 8/2010 | Chorney | B62D 25/2054 296/191 |
| 7,914,034 B2 * | 3/2011 | Roush | B29C 70/521 280/656 |
| 8,375,656 B2 | 2/2013 | Ehrlich | |
| 8,678,480 B2 * | 3/2014 | Sawada | H05K 1/0366 180/65.1 |
| 8,757,704 B2 * | 6/2014 | Zhao | B32B 3/12 296/186.1 |
| 2007/0007794 A1 * | 1/2007 | Bertoch | B62D 33/044 296/168 |
| 2007/0194602 A1 * | 8/2007 | Ehrlich | B62D 33/04 296/186.1 |
| 2009/0053458 A1 * | 2/2009 | Birrell | B62D 25/105 428/68 |
| 2009/0085378 A1 * | 4/2009 | Borchardt | B60R 13/0815 296/191 |
| 2014/0130657 A1 * | 5/2014 | Pilpel | F41H 5/0485 89/36.02 |
| 2014/0210233 A1 * | 7/2014 | Brymerski | B60J 5/0415 296/191 |

* cited by examiner

*Primary Examiner* — Gregory Blankenship
(74) *Attorney, Agent, or Firm* — Nelson Mullins Riley & Scarborough, LLP

(57) ABSTRACT

A composite wall panel for use in vehicles having a floor structure and a front wall, the composite wall panel including a first polymer resin layer having a plurality of unidirectional fibers embedded therein that are substantially parallel to a first axis, and a second polymer resin layer having a plurality of unidirectional fibers embedded therein that are substantially parallel to a second axis, the second polymer resin layer being bonded to the first polymer resin layer so that the second axis is substantially perpendicular to the first axis. The composite wall panel is disposed so that the first axis is substantially parallel to the floor structure, and the rigidity of the composite wall panel is greater along the first axis than the second axis.

13 Claims, 3 Drawing Sheets

COMPOSITE PANEL

FIELD OF THE INVENTION

The present invention relates generally to a composite panel having a greater degree of rigidity along a first axis than along a second axis that is perpendicular to the first axis.

BACKGROUND OF THE INVENTION

It is known to use wall panels having a thin outer sheet of fiberglass when constructing walls of various vehicles such as recreational vehicles, trailers, mobile homes, etc., because the thin fiberglass sheet presents an aesthetically pleasing surface. For example, one such wall panel consists of the fiberglass sheet adhered to a plywood substrate, such as by gluing. However, plywood substrates are susceptible to water damage, surface inconsistencies such as knots, irregular grain, etc., and joints between the plywood substrates of adjacent panels can be difficult to construct smoothly. As well, other known wall panels may have outer surfaces formed by other materials such as, but not limited to, polymer films, aluminum, etc.

Another known wall panel includes a fiberglass film adhered to a fiberglass/polypropylene substrate layer. These wall panels work well for planar wall sections, but tend to be fairly rigid. Difficulties can arise when using such wall sections in the front portions of trailers, recreational vehicles, etc., where it is often desirable to curve the wall, for example, where the top of a wall section joins an opposing roof panel. Attempts have been made to add more flexible top sections to such wall panels, which lead to additional manufacturing complexity, joints in the panels and subsequent cost increases. For example, top wall panel sections formed from plywood with multiple, shallow elongated grooves therein have been utilized to allow greater flexibility, as well as top sections including multiple elongated plywood strips adhered to a flexible base layer.

The present invention recognizes and addresses considerations of prior art constructions and methods.

SUMMARY OF THE INVENTION

One embodiment of the present disclosure provides a composite wall panel for use in vehicle or trailer having a floor structure that is supported by at least one pair of wheels, a roof structure spaced from and disposed opposite the floor structure, a pair of opposed sidewalls spaced from each other and extending between the floor structure and the roof structure, and a front wall and a rear wall opposing each other and extending between the floor structure and the roof structure, the composite wall panel including a first polymer resin layer having a plurality of unidirectional fibers embedded therein, the plurality of unidirectional fibers being substantially parallel to a first fiber axis of the composite wall panel, a second polymer resin layer having a plurality of unidirectional fibers embedded therein, the plurality of unidirectional fibers being substantially parallel to a second fiber axis of the composite wall panel. The second polymer resin layer is bonded to the first polymer resin layer so that the second fiber axis is substantially perpendicular to the first fiber axis. A third polymer resin layer includes a plurality of unidirectional fibers embedded therein, the third polymer resin layer being bonded to the second polymer resin layer opposite the first polymer resin layer so that the plurality of unidirectional fibers of the third polymer layer is substantially perpendicular to the first fiber axis of the composite wall panel. The composite wall panel forms a curved portion of the front wall and is disposed so that the first fiber axis is substantially parallel to the floor structure, and the rigidity of the composite wall panel is greater along the first fiber axis than the second fiber axis.

Another embodiment of the present disclosure provides a vehicle having a chassis including a wheel assembly, and a body supported by the chassis, the body including a floor structure, a roof panel, a pair of sidewalls, a rear wall and a front wall. The front wall includes a curved portion, the curved portion being formed by at least one composite wall panel. The composite wall panel includes a first polymer resin layer having a plurality of unidirectional fibers embedded therein, the plurality of unidirectional fibers being substantially parallel to a first fiber axis of the composite wall panel, a second polymer resin layer having a plurality of unidirectional fibers embedded therein, the plurality of unidirectional fibers being substantially parallel to a second fiber axis of the composite wall panel. The second polymer resin layer is bonded to the first polymer resin layer so that the second fiber axis is substantially perpendicular to the first fiber axis. A third polymer resin layer includes a plurality of unidirectional fibers embedded therein, the third polymer resin layer being bonded to the second polymer resin layer opposite the first polymer resin layer so that the plurality of unidirectional fibers of the third polymer layer is substantially perpendicular to the first fiber axis of the composite wall panel. The composite wall panel forms a curved portion of the front wall and is disposed so that the first fiber axis is substantially parallel to the floor structure, and the rigidity of the composite wall panel is greater along the first fiber axis than the second fiber axis.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
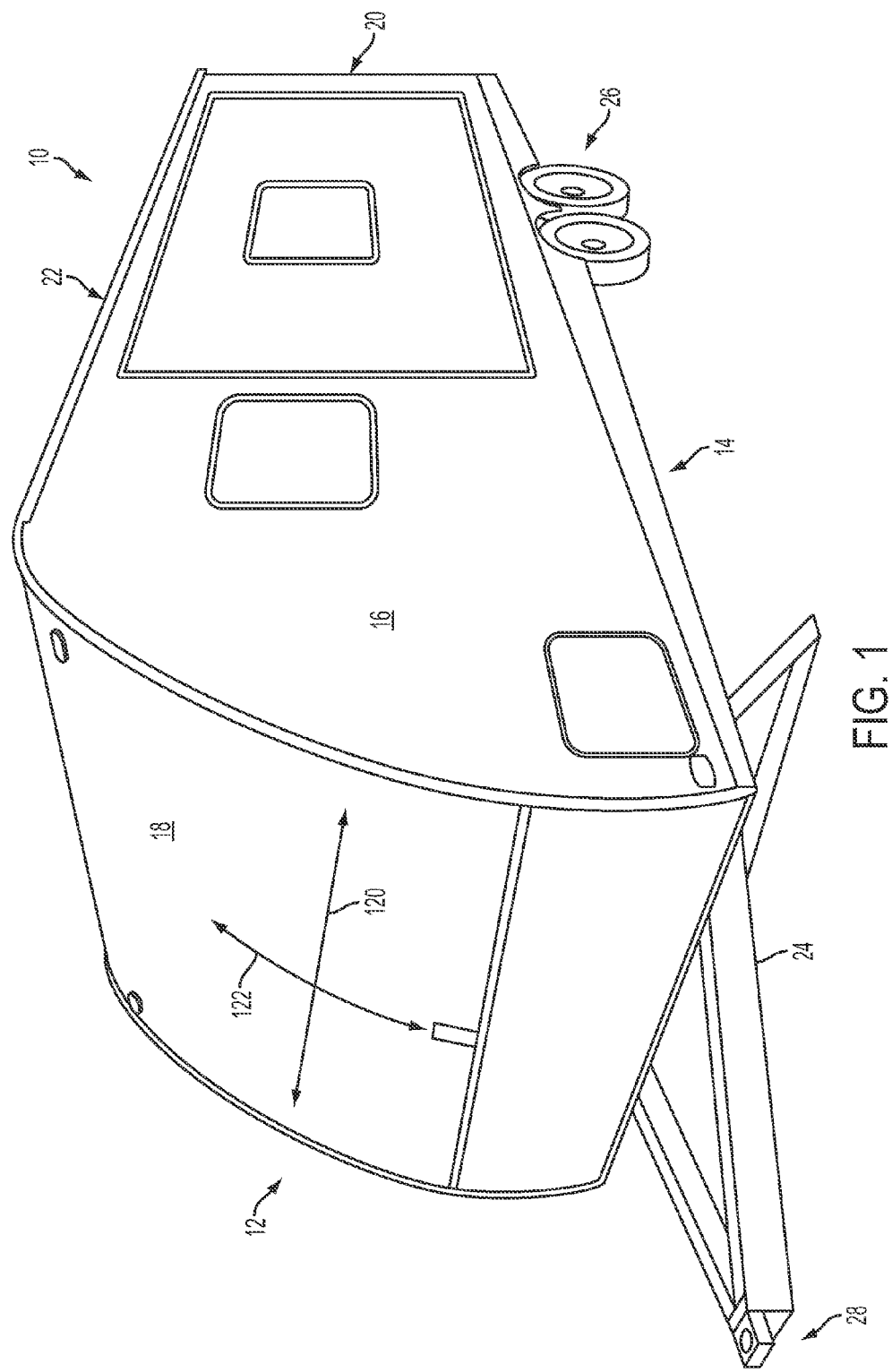
FIG. 1 is a perspective view of a vehicle including a composite panel in accordance with the present disclosure.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the Figures, FIG. 1 shows a recreational vehicle, specifically a trailer 10, in which composite wall panels (FIGS. 2 and 3) constructed in accordance with an embodiment of the present disclosure are used. As shown, trailer 10 includes a body 12 that is supported by a chassis 24. Body 12 includes a floor structure 14 that is secured to chassis 24, a roof panel 22, a pair of parallel, opposing side walls 16 (only one of which is shown in FIG. 1), a front wall 18 and a rear wall 20, all extending between floor structure 14 and roof panel 22. As in the example shown, it is known for the vehicle front wall to include at least a curved portion to both improve the vehicle's aerodynamics and provide an aesthetically pleasing appearance. In the instant case, the front wall 18 of trailer 10 forms a continuous curve (when considered in a plane perpendicular to the generally planar floor and including a longitudinal center axis of the floor perpendicular to the wheel axis) between floor structure 14 and roof panel 22. To allow towing by another vehicle, chassis 24 includes a hitch receiver 28 and wheel assembly 26.

Figure 2:
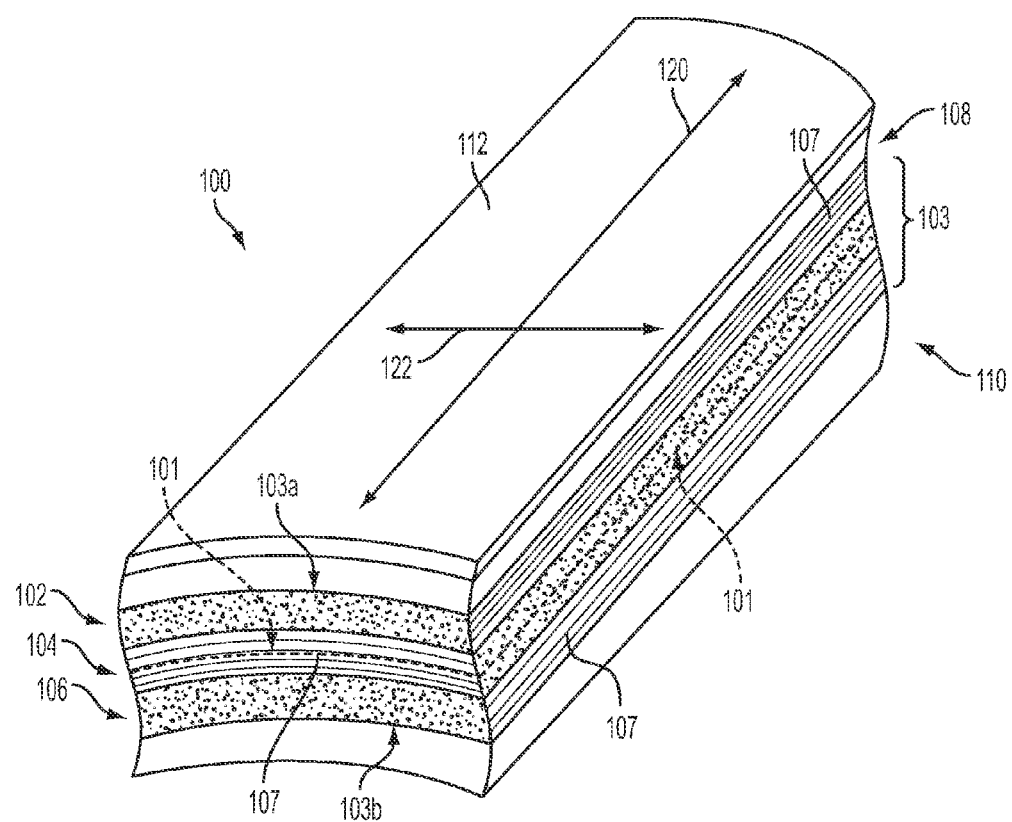
FIG. 2 is a partial cross-sectional view of the composite panel of the vehicle as shown in FIG. 1.

FIG. 2 provides a cross-sectional view of a composite wall panel 100 in accordance with one embodiment of the present disclosure. Composite wall panel 100 includes multiple fiber reinforced polymer layers. Each of a first polymer resin layer 102, a second polymer resin layer 104, and a third polymer resin layer 106 includes a plurality of unidirectional fibers embedded in a co-polymer material. For the embodiment shown, the unidirectional fibers are continuous strand glass fibers that are embedded in a polypropylene co-polymer so that the continuous strand glass fibers within each layer are generally parallel to each other. The first, second and third polymer resin layers 102, 104 and 106 are positioned over one another and are consolidated to form a unitary polymer resin layer 103 of composite wall panel 100. Second polymer resin layer 104 is disposed between first polymer resin layer 102 and third polymer resin layer 106 such that unidirectional fibers 107 of second polymer resin layer 104 are aligned in a direction that is perpendicular to a direction in which unidirectional fibers 107 of first polymer resin layer 102 and third polymer resin layer 106 are aligned. Specifically, unidirectional fibers 107 of first polymer resin layer 102 and third polymer resin layer 106 are aligned substantially parallel to a first fiber axis 120 (FIG. 1) of composite wall panel 100, whereas unidirectional fibers 107 of second polymer resin layer 104 are aligned substantially parallel to a second fiber axis 122 of composite wall panel 100.

In the embodiment shown in FIG. 2, the first, second and third polymer resin layers are similar, meaning both the thickness of the layers and the density of unidirectional fibers within each layer are substantially the same. In the present embodiment, the first, second and third polymer layers are preferably between about 0.008" to about 0.016" thick and have a weight of about 0.06 to about 0.15 lbs/sq. ft. As such, the glass to resin ratio of unidirectional fibers 107 within unitary polymer resin layer 103 of composite wall panel 100 that are substantially parallel to first fiber axis 120 is greater than the glass to resin ratio of unidirectional fibers 107 within unitary polymer resin layer 103 that are substantially parallel to second fiber axis 122. That is, a greater number of unidirectional fibers within unitary layer 103 (i.e. the combined layers 102/104/106) are aligned parallel to the first fiber axis direction (120) as compared to the number of unidirectional fibers aligned parallel to the second fiber axis direction (122), and there is a greater cross sectional (in a plane including axis 122 and perpendicular to axis 120) area of unidirectional fibers in direction 120 than the cross sectional (in a plane including axis 120 and perpendicular to axis 122) area of unidirectional fibers in direction 122. Composite wall panel 100 therefore exhibits greater rigidity, and correspondingly resistance to bending, along first fiber axis 120 than along second fiber axis 122.

Composite wall panel 100 exhibits greater rigidity along first fiber axis 120 based not only on the higher cross-sectional area of unidirectional fibers aligned with first fiber axis 120, but also due to the position of those unidirectional fibers relative to a center plane 101 of unitary polymer resin layer 103 of the composite wall panel. Specifically, center plane 101 is disposed in the middle of unitary polymer resin layer 103, substantially parallel to the outermost major surfaces 103a and 103b of the layer. As such, center plane 101 is disposed within second polymer resin layer 104. Therefore, as shown in FIG. 2, unidirectional fibers 107 of first and third polymer resin layers 102 and 106 are spaced at greater distances (considered in a direction perpendicular to center plane 101) from center plane 101 than are unidirectional fibers 107 of second polymer resin layer 104. When attempting to bend composite wall panel 100 along first fiber axis 120, unidirectional fibers 107 of first and second polymer resin layers 102 and 106 are under greater compression and tension (depending on the bending direction) than are those of second polymer resin layer 104 when attempting to bend composite wall panel 100 relative to second fiber axis 122. In short, because unidirectional fibers 107 of second polymer resin layer 104 are closer to center plane 101, they are placed under less compression and/or tension during bending. Even if the thickness of second polymer resin layer 104 is equal to that of combined first and third polymer resin layers 102 and 106 (which is an embodiment under the present disclosure, as are thicknesses of layer 104 between half of and equal to the combined thickness of layers 102 and 106), the composite wall panel exhibits greater rigidity along first fiber axis 120 due to the increased distance of unidirectional fibers 107, of the first and third polymer resin layers, from center plane 101.

In other embodiments, the glass-to-resin ratios of unidirectional fibers 107 in layers 102/106 and of unidirectional fibers 107 in layer 104 (each consider within layer 103 as a whole) may vary, as may the relative thicknesses of those two layers (102/106 and 104). In certain embodiments, for example, unidirectional fibers 107 within center layer 104 of unitary polymer resin layer 103 of composite wall panel 100 are within (whether considered by weight, number of fibers of constant construction, or by layer thicknesses when fiber density remains constant) a range of about 20% to about 40% of the total fibers in unitary layer 103, whereas unidirectional fibers 107 within outer layers 102 and 106 of layer 103 are within a range of about 60% to about 80% of the total fibers in layer 103. That is, in these embodiments, about 20% to about 40% of the fibers in layer 103 are aligned in direction 122, while about 60% to about 80% of the fibers in layer 103 are aligned in direction 120. In these or other embodiments, the overall thickness of composite wall panel 100 is within a range of about 0.020" to about 0.070", with a weight percent glass of about 30% to about 75%.

As further shown in FIG. 2, composite wall panel 100 also includes a first scrim layer 108 and a second scrim layer 110 that are laminated to the outermost surfaces of first polymer resin layer 102 and third polymer resin layer 106, respectively. First and second scrim layers 108 and 110 provide a relatively rough surface to which additional layers may be readily adhered. For example, in the present embodiment, a thermoset fiberglass sheet 112 is adhered to first scrim layer 108 with adhesive bonding to provide an aesthetically pleasing outer surface of composite wall panel 100. In one or more embodiments, fiberglass sheet 112 has a thickness of about 0.010" to about 0.060". Alternately, the outer layer of composite wall panel 100 may be formed by a fiberglass reinforced thermoset resin including a gel coat.

In use, referring again to FIG. 1, composite wall panel 100 may be used to form any one, or all, of side walls 16, front wall 18, rear wall 20 and roof panel 22. However, the advantages offered by composite wall panel 100, those being increased rigidity along first fiber axis 120 with respect to second fiber axis 122, are most notable when composite wall panel 100 is used to form a wall including a curved portion, such as front wall 18. As shown, by aligning composite wall panel 100 such that its first fiber axis 120 is substantially parallel to the horizontal floor structure 14 of trailer 10, rigidity of front wall 18 can be maintained along first fiber axis 120, while still allowing for flexibility along second fiber axis 122 so that front wall 18 may be given the desired amount of curve. Further, composite wall panel 100 may be used to form roof panel 22, wherein composite wall panel 100 is aligned such that its first fiber axis 120 is substantially parallel to the longitudinal center axis of the trailer's floor. In this manner, the rigidity of roof panel 22 is maintained from front to back of the panel, while still allowing for the side edges of the roof panel to be bent downwardly to meet the to portions of sidewalls 16. As such, roof panel 22 can be unitarily formed.

Figure 3:
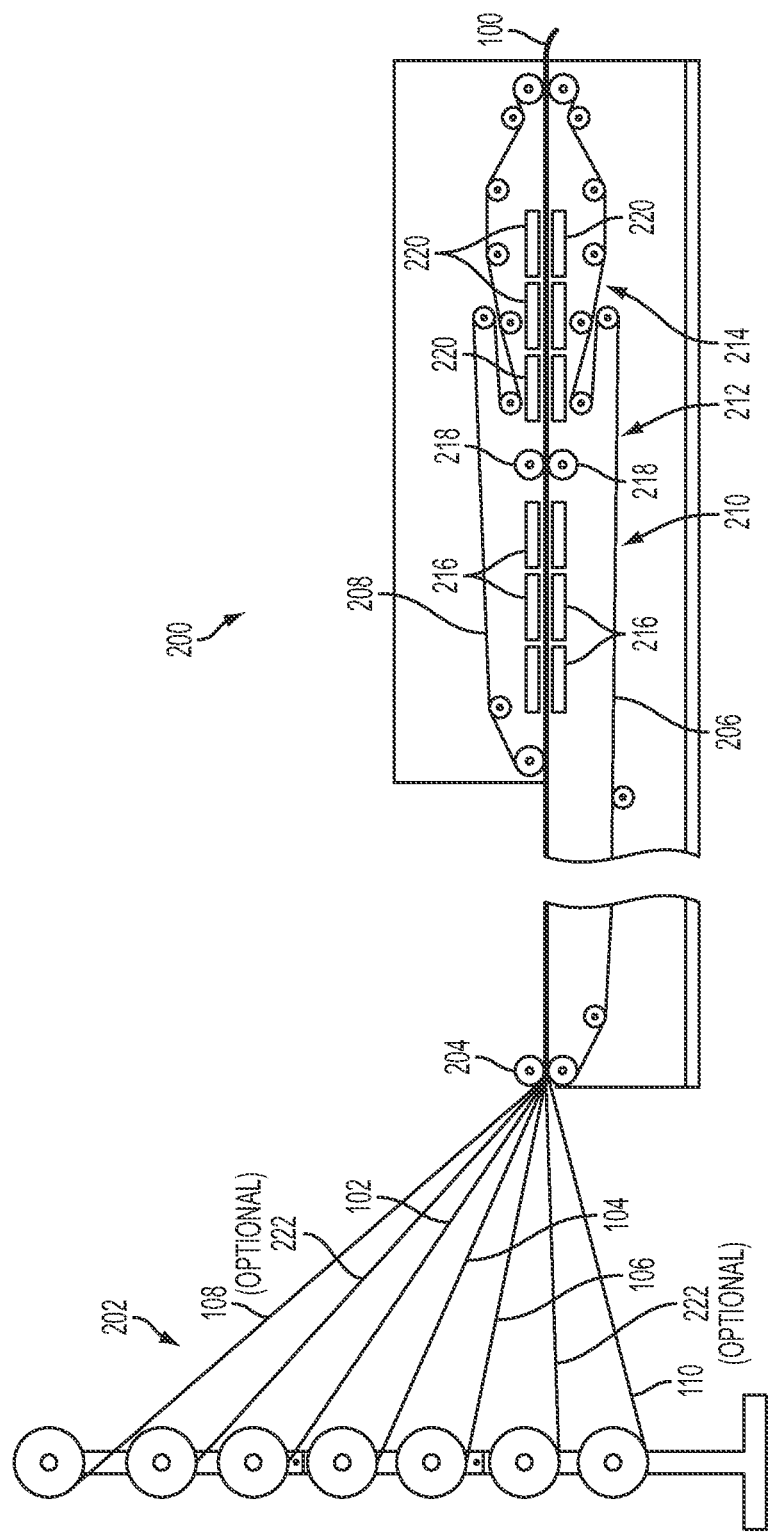
FIG. 3 is a schematic illustration of an apparatus for forming a composite panel in accordance with the present disclosure.

FIG. 3 schematically illustrates a machine 200 that consolidates the multiple layers of material into the composite wall panel shown in FIG. 2. That is, machine 200 applies heat and pressure to the multiple layers to consolidate the raw materials into a substantially rigid sheet and to achieve a desired density in the laminate. One suitable consolidation machine 200 is a contact heat oven manufactured and sold by Schott & Meissner GmbH of Germany under the name THERMOFIX. FIG. 3 should be understood to be a representative schematic example provided for illustrative purposes, however, and other consolidation machines may be used to form the laminate of the present invention.

A rack 202 of machine 200 holds multiple rolls of material that are fed into a pair of guide rollers 204 driven by a lower belt 206 so that the layers are carried down stream into the machine on the lower belt. Each layer is coplanar with the adjacent upper and/or lower layers and is generally of the same length and width so that the resultant material has uniform properties throughout.

The raw materials that form the composite panel are stored on large rolls in rack 202. FIG. 3 illustrates seven materials being fed in a coplanar manner into consolidator 200: a first scrim layer 108, a first optional adhesive layer 222, a first polymer resin layer 102, a second polymer resin layer 104, a third polymer resin layer 106, a second optional adhesive layer 222 and a second scrim layer 110. Each layer is approximately the same width and length as the other layers so that the resultant composite laminate panel 100 is uniform from end to end. In the previously described embodiment of composite wall panel 100 (FIG. 2), adhesive layers 222 are not used because first and second scrim layers 108 and 110 are embedded in the outer surfaces of first polymer resin layer 102 and third polymer resin layer 106, respectively, during the lamination process. However, in alternate embodiments, adhesive layers 222 may be used. Suitable adhesive layers include a UAF polyurethane adhesive film and a PAF polyester based heat activated adhesive film, each manufactured by Adhesive Films, Inc. of Pine Brook, N.J. It should also be understood that other forms of adhesives can be used. For example, spray adhesive can be applied to the outer surfaces of first and third polymer resin layers 102 and 106 prior to being fed into guide rollers 204. In another example, the first and third polymer resin layers can be roll coated with adhesive prior to being fed into guide rollers 204.

Referring again to FIG. 3, belt 206 faces opposite a belt 208 so that the layers of material are sandwiched between the belts. Belts 206 and 208 are coated with a non-adherent releasing film surface, for example stainless steel, TEFLON or other suitable material, so that the laminate material easily releases from the belt at the end of the machine. Belts 206 and 208 pass the layers through a heating stage 210, a calendar stage 212 and a cooling stage 214. Heating stage 210 includes pan type heating elements 216 that carry heated oil to conduct heat through belts 206 and 208 and into the input materials. The heating of first, second and third polymer resin layers 102, 104 and 106, respectively, and first and second scrim layers 108 and 100 causes the thermoplastic materials to flow so that added pressure by belt rollers 218 in calendar section 212 causes scrim layers 108 and 110 to embed or mechanically bond with the outer surfaces of unitary polymer resin layer 103 (FIG. 2). The heat also causes adhesive films 222, if present, to melt or activate.

Belt rollers 218 of calendar stage 212 apply sufficient pressure to the materials so that they bond to form a generally uniform composite panel 100. The amount of pressure depends on the temperature of the input materials and the desired thickness of composite panel 100. Once the materials have been consolidated, the soft pliable composite panel 100 solidifies at cooling stage 214. The cooling stage employs cooling pans 220 that carry water to dissipate heat retained in the laminate. The temperature of the cooling water varies between 10 and 20 degrees centigrade depending on the number of layers in the laminate and the speed of the machine so that in a preferred embodiment, the laminate is cooled to a temperature at which the laminate panel is stable and will not warp. Consolidating machine 200 is able to form a continuous sheet of varying width and length of composite material that can then be rolled, or cut and stacked in sheets, for storage.

While one or more preferred embodiments of the invention are described above, it should be appreciated by those skilled in the art that various modifications and variations can be made in the present invention without departing from the scope and spirit thereof. For example, alternate embodiments of composite wall panels in accordance with the present disclosure may have fewer, or more, layers than the number of the discussed embodiments. It is intended that the present invention cover such modifications and variations as come within the scope and spirit of the appended claims and their equivalents.

What is claimed is:

1. A composite wall panel of a vehicle having a floor structure that is supported by at least one pair of wheels, a roof structure spaced from and disposed opposite the floor structure, a pair of opposed sidewalls spaced from each other and extending between the floor structure and the roof structure, and a front wall and a rear wall opposing each other and extending between the floor structure and the roof structure, the composite wall comprising:

a first polymer resin layer having a plurality of unidirectional fibers embedded therein, the plurality of unidirectional fibers being substantially parallel to a first fiber axis of the composite wall panel;

a second polymer resin layer having a plurality of unidirectional fibers embedded therein, the plurality of unidirectional fibers of the second polymer resin layer being substantially parallel to a second fiber axis of the composite wall panel, the second polymer resin layer being bonded to the first polymer resin layer so that the second fiber axis is substantially perpendicular to the first fiber axis; and a third polymer resin layer having a plurality of unidirectional fibers embedded therein, the third polymer resin layer being bonded to the second polymer resin layer opposite the first polymer resin layer so that the plurality of unidirectional fibers of the third polymer layer is substantially parallel to the first fiber axis of the composite wall panel, the first, second and third polymer resin layers forming a unitary polymer resin layer, wherein the composite wall panel forms a curved portion of the front wall and is disposed so that the first fiber axis is substantially parallel to the floor structure, and rigidity of the composite wall panel is greater along the first fiber axis than the second fiber axis.

2. The composite wall panel of claim 1, wherein a glass to resin ratio of the unidirectional fibers within the unitary polymer resin layer that are parallel to the first fiber axis is greater than a glass to resin ratio of the unidirectional fibers within the unitary polymer resin layer that are parallel to the second fiber axis.

3. The composite wall panel of claim 2, wherein respective thicknesses of the first polymer resin layer, the second polymer resin layer, and the third polymer resin layer in a direction perpendicular to the first fiber axis and the second fiber axis are substantially the same.

4. The composite wall panel of claim 3, further comprising:
a first scrim layer bonded to an outer surface of the first polymer resin layer; and
a second scrim layer bonded to an outer surface of the third polymer resin layer.

5. The composite wall panel of claim 4, further comprising a fiberglass sheet bonded to one of the first and the second scrim layers.

6. The composite wall panel of claim 1, wherein thickness of the second polymer resin layer in a direction perpendicular to the first fiber axis and the second fiber axis is greater than thickness of the first polymer resin layer in the direction and thickness of the third polymer resin layer in the direction.

7. The composite wall panel of claim 1, wherein the unidirectional fibers of the first, the second, and the third polymer resin layers are glass fibers.

8. A vehicle comprising:
a chassis including a wheel assembly; and
a body supported by the chassis, the body including a floor structure, a roof panel, a pair of sidewalls, a rear wall and a front wall, the front wall including a curved portion, the curved portion being formed by at least one composite wall panel, the at least one composite wall panel comprising a first polymer resin layer having a plurality of unidirectional fibers embedded therein, the plurality of unidirectional fibers being substantially parallel to a first fiber axis of the at least one composite wall panel, a second polymer resin layer having a plurality of unidirectional fibers embedded therein, the plurality of unidirectional fibers of the second polymer resin layer being substantially parallel to a second fiber axis of the at least one composite wall panel, the second polymer resin layer being bonded to the first polymer resin layer so that the second fiber axis is substantially perpendicular to the first fiber axis, and a third polymer resin layer having a plurality of unidirectional fibers embedded therein, the third polymer resin layer being bonded to the second polymer resin layer opposite the first polymer resin layer so that the plurality of unidirectional fibers of the third polymer layer is substantially parallel to the first fiber axis of the at least one composite wall panel, the first, second and third polymer resin layers forming a unitary polymer resin layer, wherein the at least one composite wall panel is disposed so that the first fiber axis is substantially parallel to the floor structure, and rigidity of the at least one composite wall panel is greater along the first fiber axis than the second axis.

9. The vehicle of claim 8, wherein a glass to resin ratio of unidirectional fibers within the unitary polymer resin layer that are parallel to the first fiber axis is greater than a glass to resin ratio of the unidirectional fibers within the unitary polymer resin layer that are parallel to the second fiber axis.

10. The vehicle of claim 8, further comprising:
a first scrim layer bonded to an outer surface of the first polymer resin layer; and
a second scrim layer bonded to an outer surface of the third polymer resin later.

11. The vehicle of claim 10, further comprising a fiberglass sheet bonded to one of the first and the second scrim layers.

12. The vehicle of claim 8, wherein respective thickness of the first, the second and the third polymer resin layers are substantially the same in a direction perpendicular to the first fiber axis and the second fiber axis.

13. The vehicle of claim 8, wherein thickness of the second polymer resin layer in a direction perpendicular to the first fiber axis and the second fiber axis is greater than thickness of the first polymer resin layer in the direction and thickness of the third polymer resin layer in the direction.

* * * * *